(12) United States Patent
Lachmann (10) Patent No.: US 7,437,209 B2
(45) Date of Patent: Oct. 14, 2008

(54) MODULAR CONTROL SYSTEM FOR A GLASS FORMING MACHINE

(75) Inventor: Wolfgang Lachmann, Eriskirch (DE)

(73) Assignee: futronic GmbH, Tettnang (DE)

( * ) Notice: Subject to any disclaimer, the term of this patent is extended or adjusted under 35 U.S.C. 154(b) by 597 days.

(21) Appl. No.: 10/653,421

(22) Filed: Sep. 3, 2003

(65) Prior Publication Data

US 2004/0093902 A1    May 20, 2004

(30) Foreign Application Priority Data

Sep. 3, 2002   (EP)   .................................. 02019725

(51) Int. Cl.
*G06F 19/00* (2006.01)
*C03B 9/41* (2006.01)

(52) U.S. Cl. .................... 700/157; 700/19; 700/158; 65/160

(58) Field of Classification Search .................. 700/19, 700/20, 157, 158; 65/158, 160–164, 243–248; 505/420

See application file for complete search history.

(56) References Cited

U.S. PATENT DOCUMENTS

| | | | | |
|---|---|---|---|---|
| 4,124,889 A | * | 11/1978 | Kaufman et al. ............. | 700/3 |
| 4,582,522 A | | 4/1986 | Merz et al. | |
| 4,615,723 A | | 10/1986 | Rodriguez-Fernandez | |
| 4,705,552 A | | 11/1987 | Liska et al. | |
| 4,783,746 A | | 11/1988 | Cardenas-Franco | |
| 4,919,440 A | * | 4/1990 | Tsukamoto ............... | 280/5.502 |
| 5,073,091 A | * | 12/1991 | Burgess et al. ........... | 417/222.1 |
| 5,458,048 A | | 10/1995 | Hohner | |
| 5,495,871 A | | 3/1996 | Meloche et al. | |
| 5,580,366 A | | 12/1996 | Farkas et al. | |
| 5,812,392 A | | 9/1998 | Dutto et al. | |
| 6,456,898 B1 | * | 9/2002 | Modesto et al. ............. | 700/206 |
| 6,914,914 B1 | * | 7/2005 | Flood et al. ................. | 370/503 |
| 2002/0052669 A1 | * | 5/2002 | Nittardi et al. ............... | 700/157 |

FOREIGN PATENT DOCUMENTS

| | | |
|---|---|---|
| DE | 94 22 430 U1 | 2/2002 |
| EP | 0499393 A2 | 8/1992 |
| EP | 1122218 A2 | 8/2001 |
| EP | 1184754 A2 | 3/2002 |
| WO | 01/77534 A1 | 10/2001 |

OTHER PUBLICATIONS

European Search Report dated Oct. 27, 2003.
European Search Report dated May 20, 2003.

* cited by examiner

*Primary Examiner*—Albert DeCady
*Assistant Examiner*—Charles R Kasenge
(74) *Attorney, Agent, or Firm*—Nixon & Vanderhye P.C.

(57) ABSTRACT

A modular control system for controlling a machine such as a glass forming machine includes a central control unit and a machine control unit, which are connected via a high-speed data bus. The machine control unit is spread out to a plurality of peripheral control units via a plurality of high-speed data buses. The machine control unit is adapted to distribute control signals received from the central control unit to the peripheral control units in real time.

18 Claims, 7 Drawing Sheets

|  | Central Control Unit | Machine Control Unit | Peripheral Control Unit |
|---|---|---|---|
| Storage of Feedback Information | | | |
| S1 | X | | |
| S2 | | X | |
| S3 | | | X |
| S4 | X | X | |
| S5 | X | | X |
| S6 | | X | X |
| S7 | X | X | X |
| Processing of Feedback Information for Command Setup | | | |
| P1 | X | | |
| P2 | X | X | |
| P3 | X | X | X |

Fig. 7

MODULAR CONTROL SYSTEM FOR A GLASS FORMING MACHINE

This application claims priority to European Application No. 02 019 725.7, filed 03 Sep. 2002. The entire contents of this application is incorporated herein by reference.

FIELD OF INVENTION

The present invention relates to a control system for a glass forming machine, and in particular to a modular control system and related control method for a glass forming machine.

BACKGROUND ART

Over a long period of time, glass forming machines, e.g., of the IS type, have been used to produce suitable types of glass articles. Generally, control systems for such glass forming machines have a centralized architecture, where peripheral units are connected to a single centralized control system.

Figure 1:
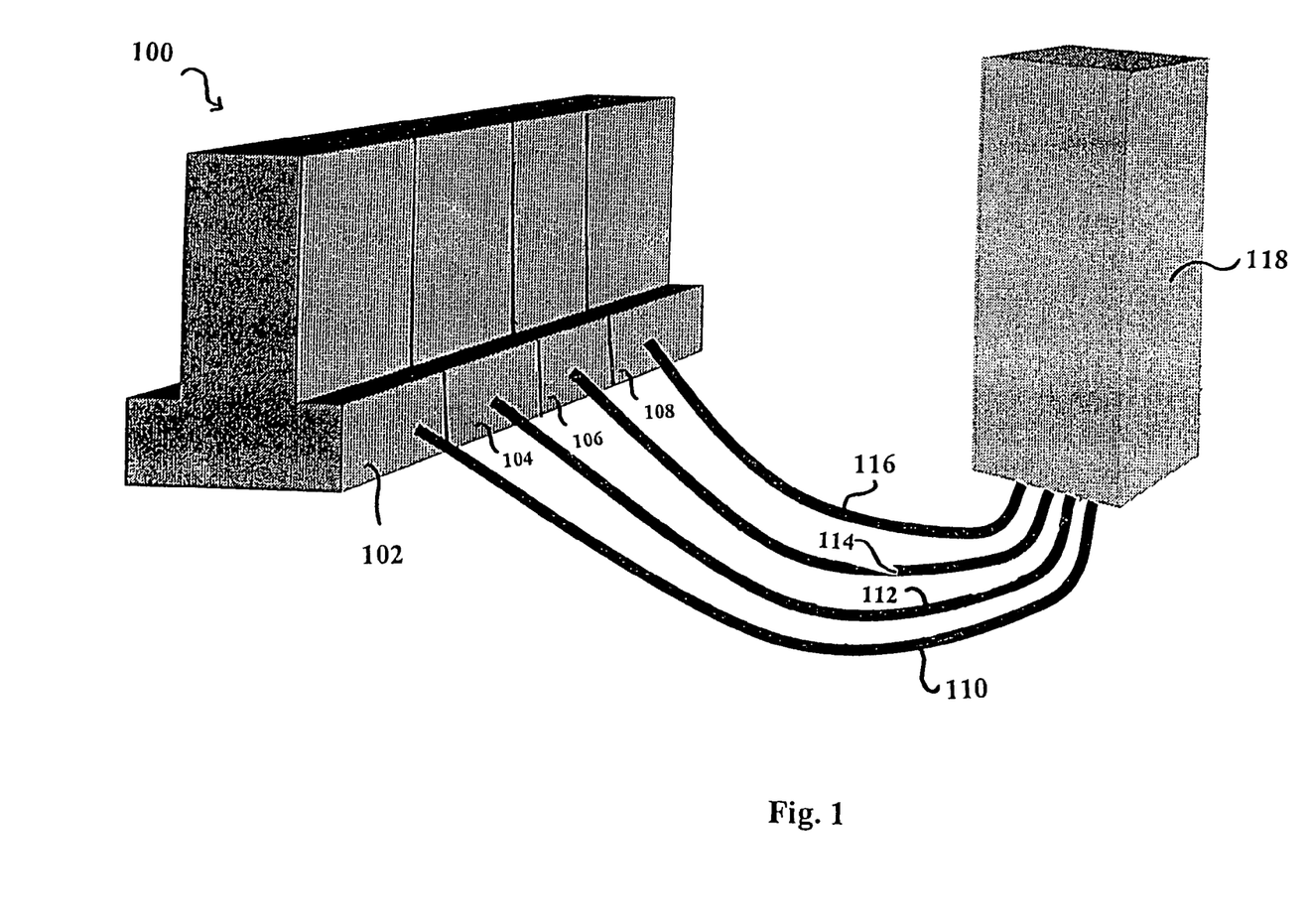
FIG. 1 shows a centralized control system for a glass forming machine according to the state of the art.

One such type of control systems is shown in FIG. 1.

As shown in FIG. 1, a glass forming machine 100 divides into a plurality of sections 102, 104, 106, 108. The peripheral control unit of each such section is connected via dedicated cables 110, 112, 114, 116 to a central control unit 118.

The control system architecture shown in FIG. 1 is disadvantageous in that this centralized solution requires for each functionality—e.g., solenoid valve—a lead of a cable and further a commonly used return cable. Further, the lead is also used to supply energy necessary for operation of the solenoid valve. For usual applications, the distance of cable is 50 m or even more. As currents of approximately 350 mA flow per solenoid valve, it is necessary to have an increased lead cross-section to reduce voltage drop, e.g., with a cable distance exceeding 50 m, a lead cross-section of 1 mm$^2$. A typical number of lead per valve block cable amounts to 50, and therefore the cable will have a diameter of approximately 30 mm. At the IS machine side, the cable will in addition be protected with a flexible steel armoured conduit, which increases the diameter even more.

To overcome these deficiencies in EP 1 184 754 A2, there is proposed a control system for a glass forming machine comprising a central control unit, a plurality of intelligent peripheral units, and a serial bus interposed between the central control unit and the different intelligent peripheral units. While such an approach improves flexibility at least to some extent, nevertheless, serious drawbacks remain. A first such drawback is that the provision of a serial bus imposes critical time restrictions for the transfer of data between the central control unit and the peripheral units. Yet another restriction is that the division of functionality between a peripheral unit being provided in relation to sections of the glass forming machine and a central control unit is maintained as shown in FIG. 1, which severely restricts control system architecture flexibility.

SUMMARY OF INVENTION

In view of the above, the object of the invention is to achieve modularity in a modular control system for a glass forming machine, both on a structural and functional level.

Heretofore, according to the present invention, there is provided a modular control system for a glass forming machine, comprising at least one central control unit, at least one machine control unit which is connected to the central control unit via a high speed data bus. Further, the modular control system comprises a plurality of peripheral control units again being connected to the machine control unit through related high speed data buses. The machine control unit is adapted to distribute control signals and related control information received via the high speed data bus to the plurality of peripheral control units, preferably in real time.

An important advantage of the present invention is that it overcomes the restriction on control system architecture previously being known through introduction of a control system sub-unit on the machine level. In other words, the present invention must no longer rely on a division of functionality between a centralized control unit and peripheral units, but allows for introduction of intermediate level control units like the machine control unit to optimize modularity of the system, both on a functional and a structural level.

In other words, an extension of a glass forming machine and the related control system may easily be achieved just by adding further peripheral control units.

It should be noted that the star topology used for the present modular control system, i.e., a star connection for the central control unit to the at least one machine control unit, and further related star connections from the machine control unit to related peripheral control units, is perfectly adapted to support modularity when extending installed glass forming machines and related control systems.

Typically, the realized bus system will be operated in a serial manner where information—which is requested in parallel per se at the peripheral control unit—is provided through time division multiple access in a serial manner via the bus. Each such serial bus will transmit requested information in a time multiplexed manner using only one lead. As peripheral units will draw only a very small current, there will be a very small voltage drop also in case the cross-section of the leads in the serial bus system is reduced. As driver units requested for operation of the peripheral units are arranged in close proximity to the related peripheral units, the energy necessary for operation of these units may be provided separately—i.e., not via the bus system—to achieve improved handling capability.

According to another preferred embodiment of the present invention, at least one peripheral control unit is integrated into a housing being attachable to a device being controlled by the peripheral control unit.

An important advantage of this preferred embodiment of the present invention is that space being available anyway in housings provided for, e.g., connectors being attachable to valve blocks, is used to accommodate sub-components of the modular control system. This achieves, firstly, avoidance of extra housings and therefore cost savings and, secondly, the provision of peripheral control units in the immediate neighbourhood of those actuators/sensors which are controlled thereby.

According to another preferred embodiment, at least one peripheral control unit controls at least one peripheral driver unit. Preferably, the peripheral driver unit comprises a measurement unit adapted to measure a current flowing into a peripheral unit driven by the peripheral driver unit. Alternatively, the measurement unit may be adapted to measure a voltage applied across the peripheral unit. Further, the measurement unit may measure an analogue value of current and/or voltage and/or determine a measurement classification, e.g., high value, correct value, low value.

An important advantage of this preferred embodiment of the present invention is the generation of failure information for immediate response to a failure case. Further, the provision of a measurement unit allows for an automized shut down on occurrence of a failure situation in the modular control system without intervention of the operator of the glass forming machine.

An other important advantage is the option to provide qualified information on a failure situation at a operator console of the glass forming machine in support of failure corrective action.

According to another preferred embodiment of the present invention, the machine control unit comprises a maintenance stop unit adapted to process security related signals in an autonomous manner in view of safety specifications.

A first advantage of this embodiment is that security related functionality and information is handled using the bus system. This allows to facilitate wiring and the exchange of security related signal information to corresponding control units in the system. In particular, this preferred embodiment of the present is well suited to glass forming machines having a plurality of sections, where each section has its own service panel with lamps, keys, and switches, e.g., maintenance stop keys. Here, contrary to known solutions relying on an electromagnetic link between the maintenance stop key and the system sub-unit handling the maintenance stop signal and in addition to that on a closed circuit current being wired in parallel, the present invention achieves a much more efficient bus based coupling of the maintenance stop key to the related control system sub-units on the basis on a bus based integrated system approach.

Another advantage is achieved when the maintenance stop unit is combined with the measurement unit explained above, as then the handling of a failure situation may be completely effected autonomously in the machine control unit without intervention of the central control unit. Firstly, local processing means reduce delay time for security related data transmission, and thus increase security. Secondly, the processing load on the central control unit is reduced, therefore achieving a further reduction of processing load and required transmission bandwidth. It should be noted that only the modular architecture of the control system outlined above allows for such advantages regarding local processing of information.

According to a further preferred embodiment, the maintenance stop unit is adapted to receive security related signals via different input channels for redundant processing using parallel hardware.

The duplication of hardware for the maintenance stop unit increases the security level of the modular control system. Further, the provision of different input channels—which need not necessarily be operated according to the same protocol as the data bus provided between the different sub-components of the modular control system—allows for optimal adaptation to security related issues within the modular control system.

According to another preferred embodiment of the present invention, the modular control system comprises at least two processing units in the central control units which are connected via a local area network. Preferably, while all processing units use a common display unit, the system behaviour at the display unit is independent of the actual number of processing units.

The major advantage of this preferred embodiment is that modularity is not only achieved with respect to the overall architecture of the control system, but also on the different levels of hierarchy in the architecture, in this case the highest level. Depending on the processing requirements imposed on the central control unit, it is possible to easily extend processing capabilities.

According to another preferred embodiment, different components of the central control unit are accommodated in a multifunctional rack. Preferably, the multifunctional rack is adapted to accommodate a valve driver unit, an analog output unit, a binary input unit, or a central processing unit, whichever is suitable.

An important advantage of this preferred embodiment is that at the time of setup of the modular control system, it is not necessary to assign the rack for all components on the central hierarchy level in advance. Assuming that a multifunctional rack has a sufficient number of plug-in positions, it is possible to easily extend functionality of the modular control system of the glass forming machine simply by adding further plug-in components carrying processing units, valve drivers, analog outputs, binary inputs, etc.

Yet another preferred embodiment of the present invention is related to achieve interfacing between the modular control system and a programmable logic controller. Preferably, there are provided virtual outputs to the programmable logic controller for forwarding internal state information of the modular control system to the programmable logic controller, and also preferably, virtual inputs for input of control command from the programmable logic controller to the modular control system.

An important advantage of these preferred embodiments of the present invention is that the operation of the modular control system may be influenced by a programmable logic controller such that the program of the programmable logic controller need not be familiar with the particularities of the modular control system. In other words, modularity is not only achieved on a structural level but also on a functional level such as function of the modular control system and operation of the programmable logic controller, respectively.

According to yet another preferred embodiment of the present invention, the machine control unit and/or each peripheral control unit may be realized in dedicated hardware.

A main advantage of using dedicated hardware is that the use of freely programmable logic arrays instead of microcontroller systems allows for significantly increased fail safety, which is of particular importance in view of the arrangement of the peripheral control units in close proximity to the peripheral units like solenoid valves. Also, processing within the dedicated hardware may be achieved in parallel and therefore with a much higher speed.

Another advantage of this preferred embodiment is that space requirements—in particular in view of the provision of circuitry in a housing such as a connector housing—are minimized.

A further preferred embodiment of the present invention relates to a method of controlling a glass forming machine having an operating cycle dividing into a plurality of operating sub-cycles. The method comprises the steps of issuing a plurality of commands from a central control unit to at least one peripheral unit in sequence during each operating sub-cycle and collecting feedback information during at least one operating sub-cycle and determining on control for the next sub-cycle in dependence of the feedback information.

Therefore, according to the present invention it is proposed for the first time to achieve control of a glass forming machine using feedback information from the process to extend sequence functionality. Two major advantages are increase of operation speed and the option to intervene with the glass forming process. The reason for the first advantage is that usually a security time slot provided in previous systems may be avoided as feedback on achievement of a certain job controlled by the control system allows to initiate the subsequent instruction without delay. The reason for the second advantage is that the provision of feedback information allows to identify situations where the operator of the glass forming machine may wish to intervene with the glass forming process.

Further, it should be noted that the inventive method described so far may be applied to any manufacturing process having an operating cycle dividing into a plurality of operating sub-cycles, i.e., in correspondence with other product-forming contexts. Segments of a previously closed operating cycle are generally freely definable via an interface for configuring the manufacturing system. In particular, such an interface functionality should allow for a definition of sub-cycles of the operating cycles and the relation of such sub-cycles to different sub-steps in the overall operating cycle.

According to another preferred embodiment of the present invention there is provided a computer program product directly loadable into the internal memory of at least one processor comprising software code portions for performing the inventive method when the product is run on a processor, e.g., of the central control unit, the machine control unit, and/or the peripheral control unit of a modular glass forming machine control system.

Therefore, the present invention is also provided to achieve an implementation of the inventive method steps on computer or processor systems. In conclusion, such implementation leads to the provision of computer program products for use with a computer system or more specifically a processor comprised in, e.g., a modular glass forming machine control system.

This program defining the functions of the present invention can be delivered to a computer/processor in many forms, including, but not limited to information permanently stored on non-writable storage media, e.g., read only memory devices such as ROM or CD ROM discs readable by processors or computer I/O attachments; information stored on writable storage media, i.e. floppy discs and harddrives; or information convey to a computer/processor through communication media such as network and/or Internet and/or telephone networks via modems or other interface devices. It should be understood that such media, when carrying processor readable instructions implementing the inventive concept represent alternate embodiments of the present invention.

BRIEF DESCRIPTION OF DRAWING

In the following, preferred embodiments of the present invention will be described with respect to the drawing; in which.

DESCRIPTION OF PREFERRED EMBODIMENTS

In the following, preferred embodiments of the present invention will be described with reference to the drawing. Here, it should be noted that while different embodiments and related features are described with reference to specific figures of the drawing, nevertheless, all these features may be easily combined to provide further variations and modifications of the present invention.

Figure 2:
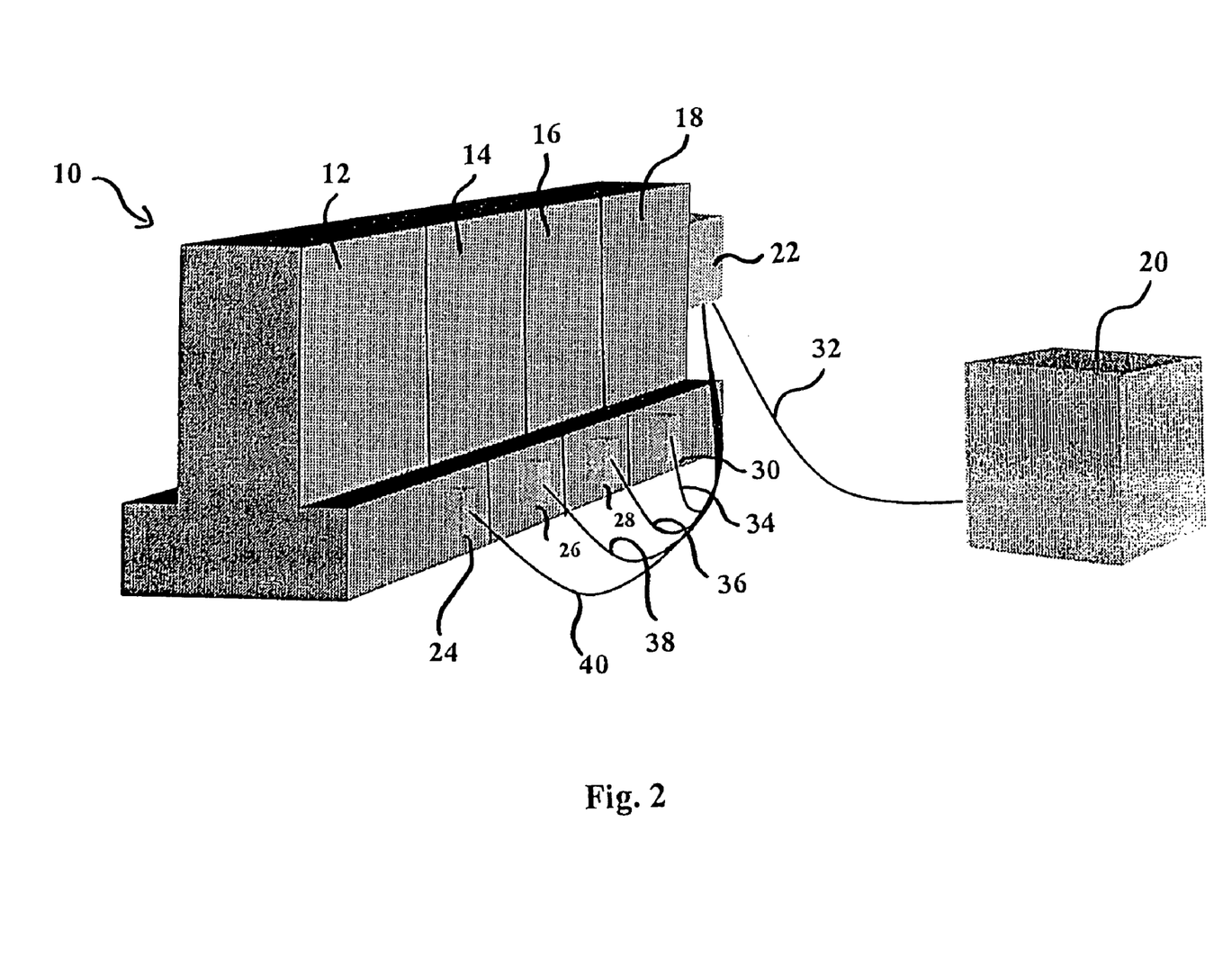
FIG. 2 shows a modular, decentralized control system for a glass forming machine according to the present invention.

FIG. 2 shows an architecture of a modular, decentralized control system for a glass forming machine according to the present invention.

As shown in FIG. 2, a glass forming machine 10 divides into a plurality of sections 12, 14, 16, and 18. It should be noted that while in FIGS. 2 and 4 such sections are shown, in general the number of sections may be freely determined considering application requirements.

As also shown in FIG. 2, there is provided a modular control system for control of operation of the glass forming machine 10. The modular control system comprises a central control unit 20, a machine control unit 22, and a plurality of peripheral control units 24, 26, 28, and 30 in relation to the different sections 12, 14, 16, and 18 of the glass forming machine, respectively. The central control unit 20 is connected to the machine control unit 22 via a high speed data bus 32. Further, the machine control unit 22 is connected to the different peripheral control units 24, 26, 28, 30 through high speed data buses 34, 36, 38, and 40, respectively.

While FIG. 2 shows a single machine control unit in combination with a plurality of peripheral control units, it should be mentioned that according to the present invention also a plurality of machine control units may be attached to the central control unit for control of an increased number of sub-sections of the glass forming machine, e.g., an IS machine.

Generally, the architecture outlined above with respect to FIG. 2 is using a hierarchy of control units—i.e., central control unit, at least one machine control unit, and a plurality of peripheral control units—together with a star connection topology for connecting both the central control unit to at least one machine control unit, and also the at least one machine control unit to sub-ordinate peripheral control units.

It is this hierarchical concept that allows to achieve maximum flexibility in design, maintenance, and extension of control systems for glass forming machines, as will be explained in more detail in the following.

Figure 3:
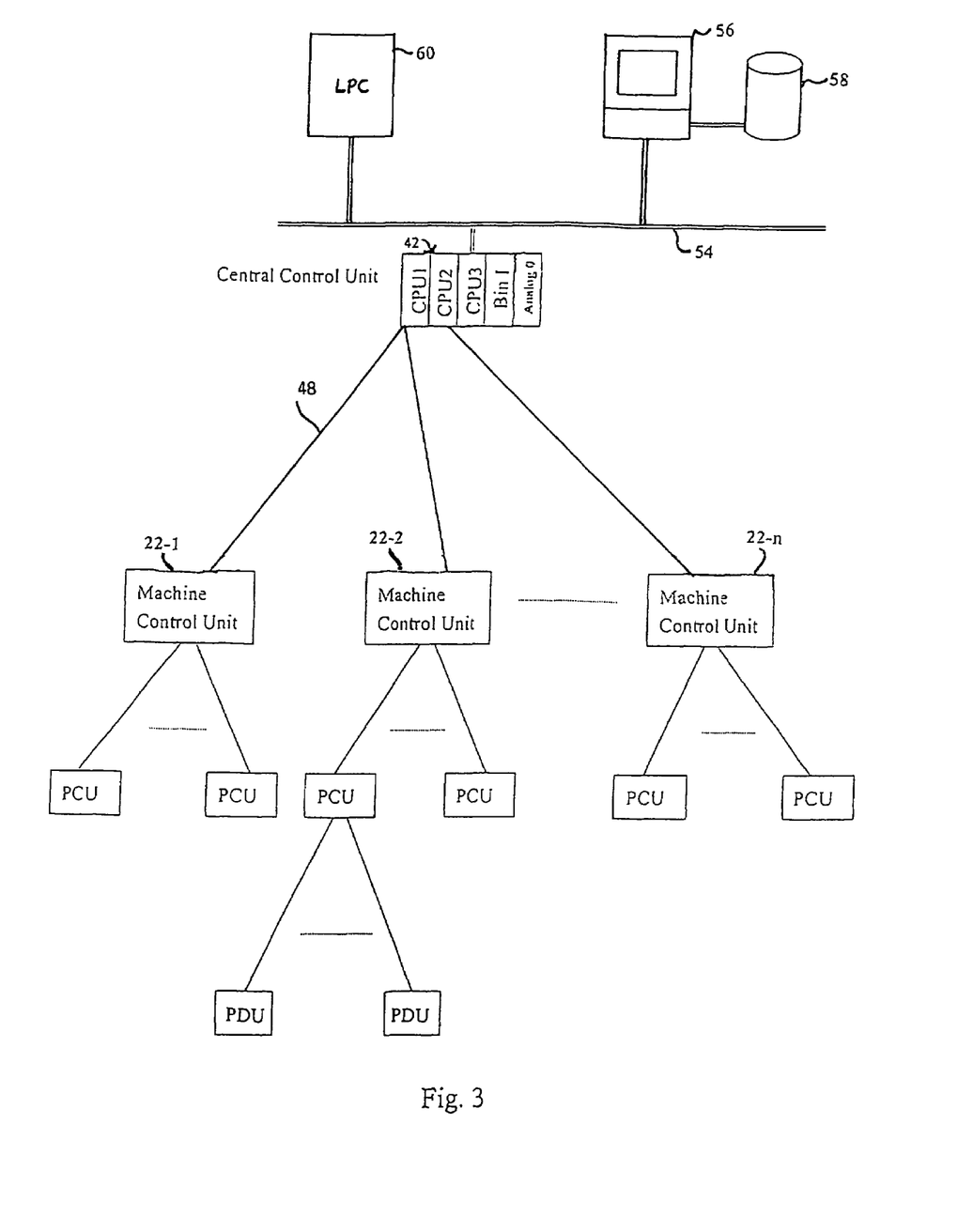
FIG. 3 shows a schematic diagram of the decentralized control system as shown in FIG. 2.

FIG. 3 shows a schematic diagram of the decentralized control system shown in FIG. 2.

As shown in FIG. 3, the central control unit 20 comprises a plurality of sub-units, i.e., at least one central processing unit CPU 42, and optionally a binary input 44 and/or an analog output 46. The interface between the central control unit 20 and the different machine control units 22-1, . . . , 22-n is achieved using a dual port memory (not shown in FIG. 3) which may be integrated into each central processing unit CPU. The dual port memory is the linking element between the control itself and a binary high-speed bus system, comprising a binary high-speed bus master also referred to as BHSB master and, e.g., being as well integrated into each central processing unit CPU, further the binary high-speed bus 48, binary high-speed bus hubs in the machine control unit 22-1, . . . , 22-n (not shown in FIG. 3), and binary high-speed bus slaves like peripheral control units PCU and peripheral driver units PDU, the peripheral control unit having a digital input and an analog output.

As shown in FIG. 3, one level of hierarchy in the modular control system is the level of machine control units 22-1, . . . , 22-n explained in more detail in the following. Each single machine control unit 22-1, . . . , 22-n is connected to a plurality of peripheral control units PCU via related binary high-speed buses. Further, each peripheral control unit PCU may again control the operation of a peripheral unit, e.g., an actuator, a sensor, or a combination thereof.

It should be noted that each machine control unit 22-1, 22-n operates under control of the central control unit 20 for control of the peripheral units. Therefore, the central control unit 20 must meet real time requirements that exist for the operation of the peripheral units.

Options for units driven by a peripheral control unit are feeder and rotary tube motor, distributor and scissor assembly motor, conveyor motor, gob distributor as shear assembly motor, servo units like servomotor, electronic scissor servomotor, pushermotor, inverter unit servomotor, or takeout servomotor.

It should be noted that these are examples only and any other type may be connected to a peripheral control unit as long as its control is supported through the modular control system.

As also shown in FIG. 3, the central control unit 20 may be connected via a backend network 54—e.g., using TCP/IP to a remote computer system comprising a computer 56 being linked to a database 58. Additionally, the central control unit may optionally be connected to a programmable logic controller 60 through the backend network 54.

Operatively, the computer 56 may serve as common display unit for the different CPUs comprised in the central control unit 20. Further, the computer 56 may be used to set up control programs, store operative profiles and related control data in the database 58.

Of particular advantage is the interfacing between the programmable logic controller 60 and the central control unit 20. For the exchange of data there are used so-called virtual outputs to the programmable logic controller 60, for forwarding internal state information of the modular control system to the programmable logic controller 60, and further virtual inputs for input of control commands from the programmable logic controller 60 to the modular control system. Here, it should be noted that the connection between the central control unit and the programmable logic controller 60 is achieved, e.g., via a field bus system CANopen. The benefit of this approach is that related functionalities are available within the central processing unit(s) of the central control unit anyway, and therefore no separate interface unit must be provided for.

The important advantage of this approach is that operators being familiar with any type of programming language for the programmable logic controller may run the modular control system using the programmable logic controller 60 without the requirement to be familiar with particularities and the internal structure of the modular control system. The reason for this is that state information available internally in the modular control system may be processed by the programmable logic controller 60.

Further operatively, the backend computer 56 and the related database 58 may be operated according to any predefined standard, e.g., a standard like SQL. Preferably, one would apply this standard SQL using only a sub-set of instructions so as to achieve interoperability between different database providers. Further, the TCP/IP standard used for the backend network 54 is particularly suited to achieve a supervisory infrastructure on top of a plurality of modular control systems and also remote maintenance and surveillance/controlling.

A further aspect of the decentralized control system is the accommodation of different sub-units of the central control unit 20—i.e., the central processing units, optionally the binary input and the analog output—into a multifunctional rack.

In other words, the multifunctional rack (not shown in FIG. 3) accommodates sub-units of the central control unit like the central processing unit 42, the binary input 44 or the analog output signal 46 as plug-in units into the multifunctional rack.

Heretofore, all plug-in units—irrespective of the functionality implemented thereon—follow the same connector definition. After plug-in of the plug-in unit, there follows an arbitration process aiming at an exchange of addresses between the different plug-in units for related communication, and further determination which one of the plug-in units will take the master roll and which of the plug-in units will be slave units to the master unit.

While each plug-in unit follows the same connector definition, it should be noted that not every single plug-in unit must be activated for each single connector pin, but may also be operated using only a sub-set of such connector pins.

Further, an important advantage is that the slot for the plug-in of a plug-in unit into the multifunctional rack is freely selectable and does not determine the subsequent operation of the plug-in unit as long as there are obeyed rules for determining which of the plug-in units will be the master unit, e.g., a central processing unit plug-in card situated at the most left slot of the multifunctional rack.

Further, it should be noted that a plurality of multifunctional racks may be provided in case the number of plug-in units is increased to extend functionality. This again is an indication of consistent maintenance of the modularity concept underlying the present invention.

Further, it should be noted that for exchange of data between the central control unit 20 in each of the machine control units 22-1, . . . , 22-n and further between each of the machine control units and a peripheral control unit any type of bi-directional data bus protocol may be used as long as the real time constraints existing for a data exchange between the related sub-units are achieved.

E.g., one may either use a proprietary protocol or the CAN and CANopen field bus protocol for sensors/actuators operating according to the related bandwidth of data exchange on the buses.

Further, it should be noted that besides the implementation of the bus protocol, in particular the machine control unit 22-1, . . . , 22-n and the peripheral control unit PCU may be implemented using dedicated hardware, e.g., ASIC technology, FPLA technology, or any other type of integrated circuitry. This is of particular advantage in minimizing the space requirements for related sub-units of the modular control system and further for increasing operative speed thereof. Even more important, the use of dedicated hardware also allows to increase the operating speed through parallel processing and to increase fail safety of implemented control system sub-units.

In the following, further details of the machine control units and the peripheral control units will be explained with reference to FIGS. 4 and 5. Heretofore, FIG. 4 shows a further detailed schematic diagram of the modular control system according to the present invention, and FIG. 5 shows a particularly advantageous arrangement of peripheral control units in a housing, e.g., a connector housing.

Figure 4:
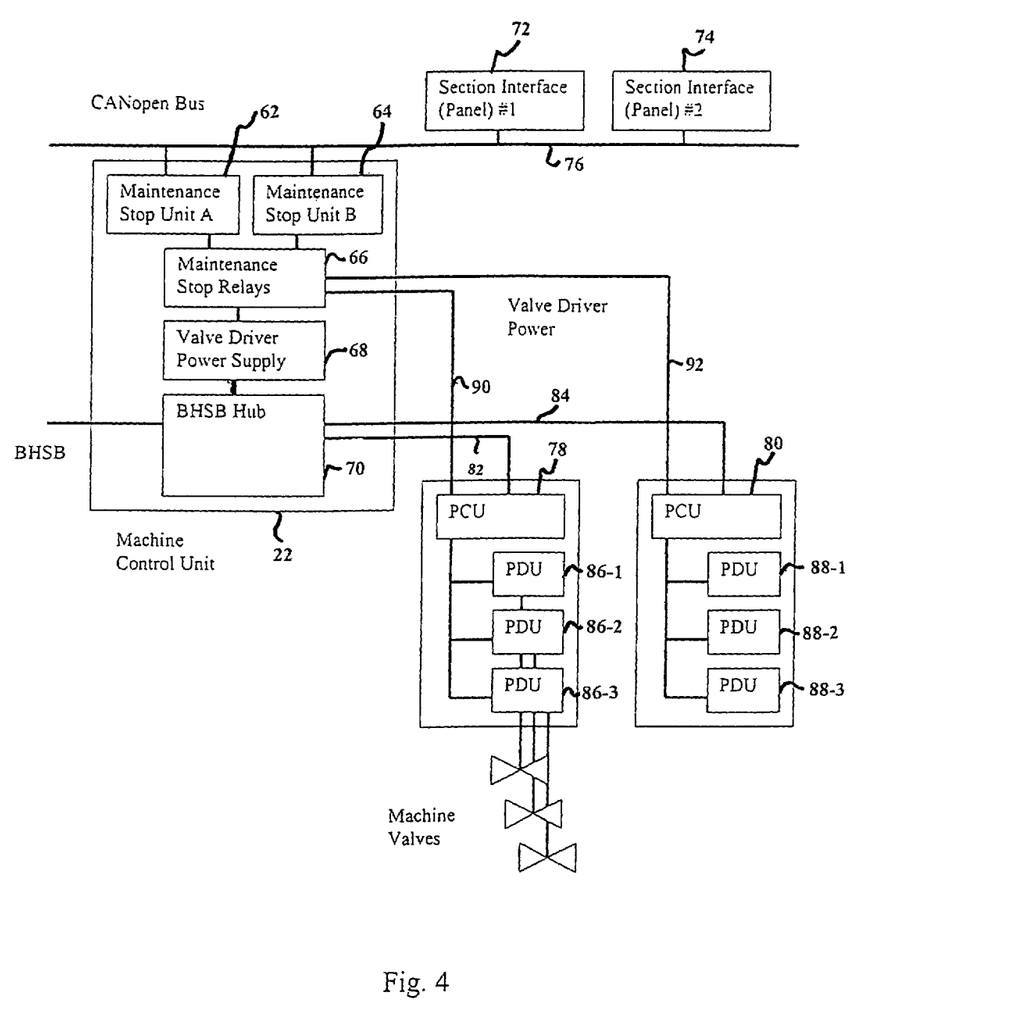
FIG. 4 shows a further detailed schematic diagram for the decentralized control system shown in FIG. 3.
Figure 5:
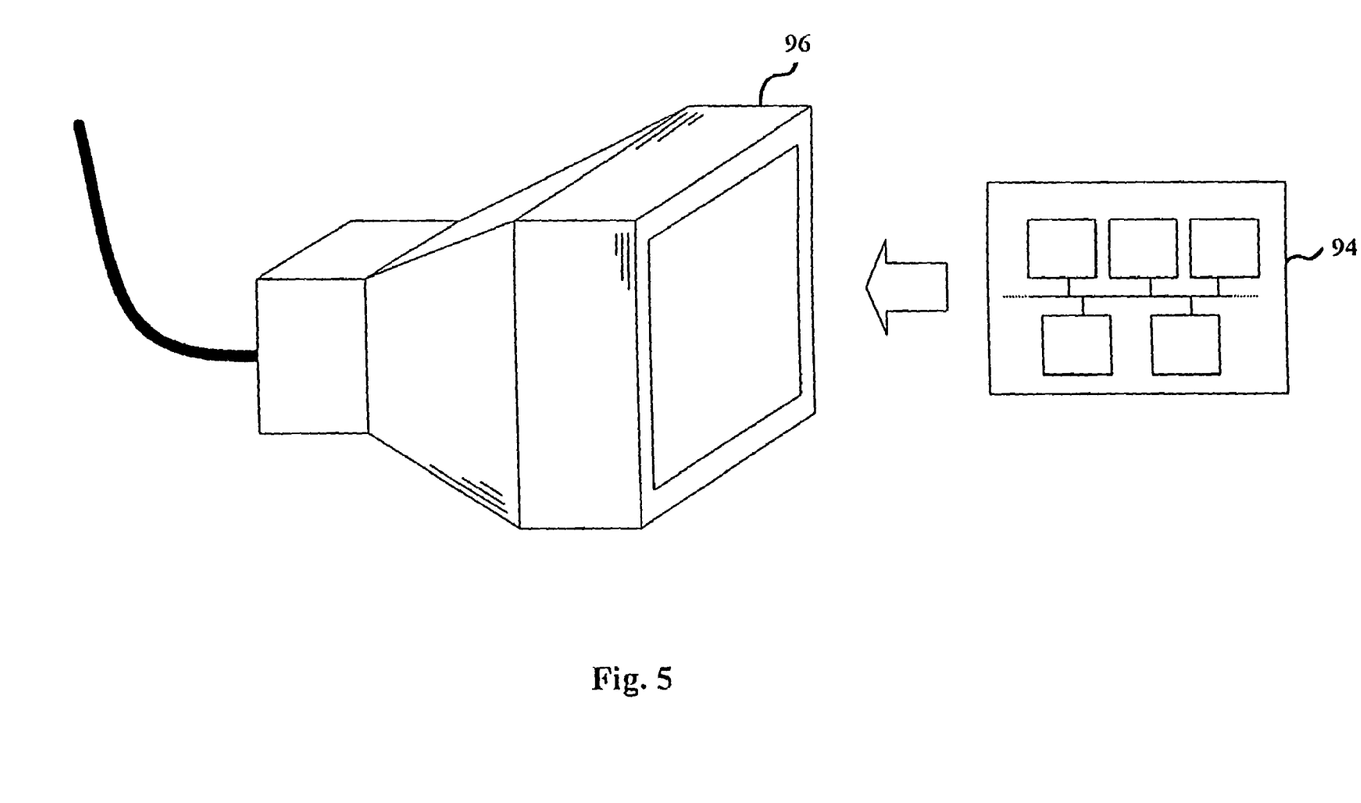
FIG. 5 shows a connector housing accommodating electronic circuitry according to the present invention.

As shown in FIG. 4, each machine control unit 20 comprises a first maintenance stop unit 62, a second maintenance stop unit 64, maintenance stop relays 66, a valve driver power supply 68, and a binary high-speed bus hub 70.

As shown in FIG. 4, the different maintenance stop units 62, 64 of the machine control unit 22 are connected to at least one section interface 72, 74, . . . , using a field bus, e.g., a CANopen Bus 76.

As also shown in FIG. 4, the hub unit 70 of the machine control unit 22 is connected to a plurality of peripheral control units PCU 78, 80, via a related binary high-speed bus 82, 84. Each peripheral control unit 78, 80 is adapted for exchange of control data with at least one peripheral drive unit 86-1, . . . , 86-3 and 88-1, . . . , 88-3, respectively, which peripheral drives units PDU again are adapted to drive machine valve or interact with other peripheral units like actuators, sensors, etc.

As also shown in FIG. 4, the peripheral control units 78, 80 are not only connected with the binary high-speed bus hub 70 in the machine control unit, but also to a valve driver power supply unit 68 via related connections 90 and 92 and the maintenance stop relays 66 provided within the machine control unit 22. These further connections 90, 92 allow to provide the power necessary for the operation of the peripheral units such as machine valves and also to interrupt such a power supply when the maintenance stop relays 66 are activated through the section interfaces 72 and/or 74 and the maintenance stop units 62 and/or 64.

Operatively, the field bus 76 allows to maintain a communication between the maintenance stop units 62, 64 and the section interfaces 72, 74 without involvement of the central processing unit. This communication serves to check continuously the operativeness of the components being attached to the field bus 76 via related section interfaces 72, 74. Immediately upon detection of such non-operativeness, the maintenance stop unit 62, 64 will interrupt the supply of power to any peripheral unit through de-activation of the maintenance stop relay 66. Otherwise, the release of the power supply requires also the provision of related control information through the central control unit via the binary high-speed bus 52. Without such indication, the peripheral driver units 86-1, . . . , 86-3 and 88-1, . . . , 88-3 will not be able to drive a peripheral unit, e.g., machine valves.

Further, the control command to the peripheral control units 78, 80 and therefore also to the peripheral driver units 86-1, . . . , 86-3 and 88-1, . . . , 88-3 and related valves, actuators, . . . are provided from the central control unit 20 to the machine control unit 22, are amplified by the hub unit 70 of the machine control unit, and then distributed by the same hub unit 70 to the connected TCU/PDU combinations.

Although not shown in FIG. 4, optionally a measurement unit may be provided in at least one of the peripheral driver units 86-1, . . . , 86-3 shown in FIG. 4. This measurement unit may either measure a current flowing to a peripheral unit e.g., a machine valve—or alternatively a voltage applied across such a peripheral unit. Further, the measurement value may be provided in the form of an analog value or in the sense of a classified value, e.g., within operative range, above operative range, below operative range. The related measurement information will then be re-directed to the modular timing system by the related peripheral control unit using the binary high-speed bus.

FIG. 5 shows a further detail being related to the realization of the peripheral control unit.

As shown in FIG. 5, the functionality of the peripheral control unit may be provided on a printed circuit board 94, which may then be accommodated into a housing 96, e.g., a connector housing provided to attach a connection line for submission of control related information to actuators in the glass forming machine.

In other words, according to the present invention it is proposed to use available space in hardware components like housings provided at the glass forming machine for accommodation of circuitry implementing control functionality. This approach allows to further minimize space and to enhance modularity of the control system.

Preferably, the housing 96 may be a connector housing which is attachable to a valve block comprising a plurality of valves. Alternatively, a plurality of valves must not be arranged in a valve block, but may be over a predefined sub-space of the glass forming machine.

In the following, a further aspect of modular control of a glass forming machine on a functional level will be described with respect to FIG. 6 and FIG. 7.

Generally, it should be noted that the functionality described in the following may be achieved using any type of programming language, preferably an operating system independent programming language, e.g., JAVA.

Figure 6:
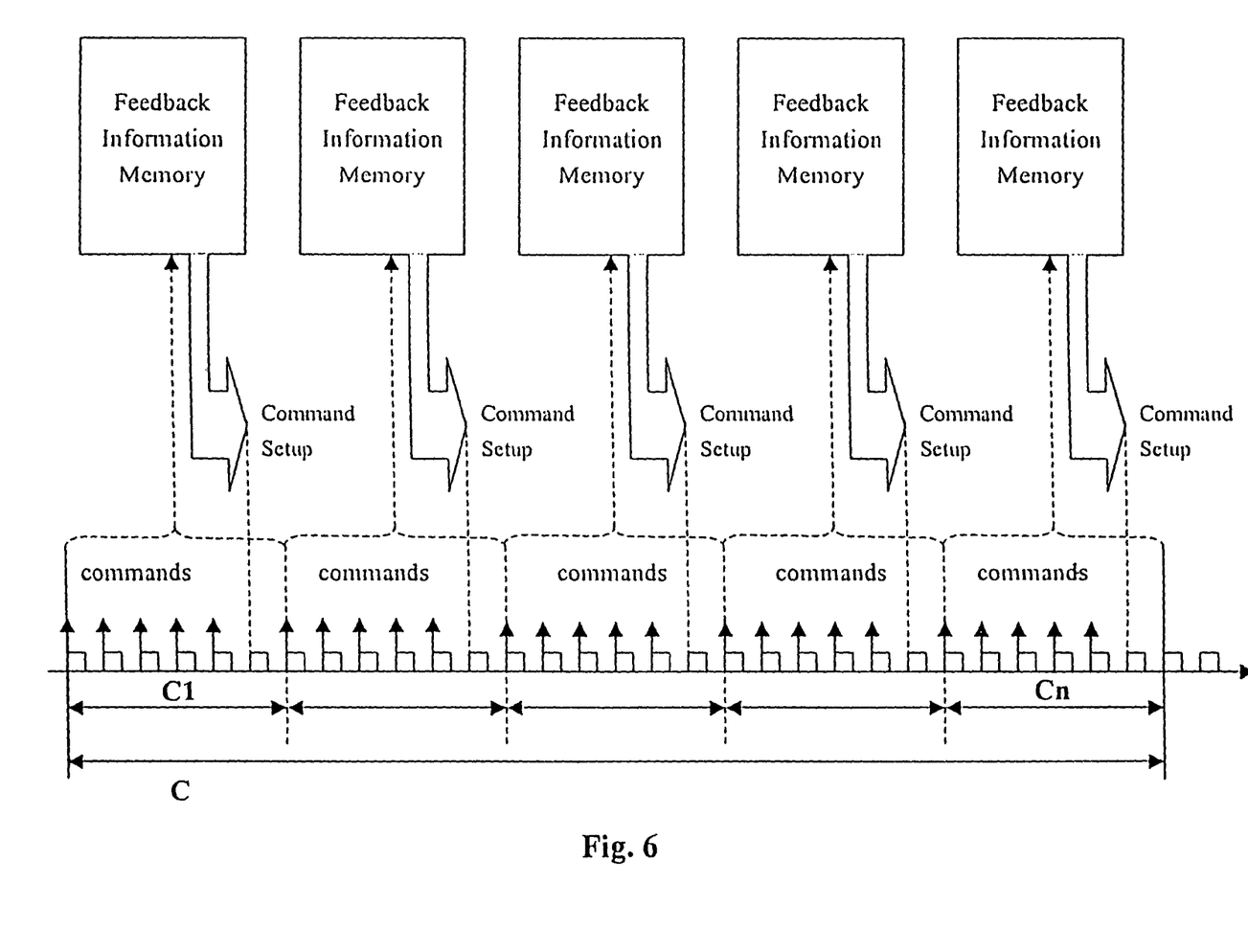
FIG. 6 shows a diagram illustrating a method of controlling a glass forming machine according to the present invention.

As shown in FIG. 6, the method of controlling a glass forming machine according to the present invention divides an operating cycle C of the glass forming machine into a plurality of sub-cycles C1, . . . , Cn. In each sub-cycle at least one command is issued from the central control unit to at least one peripheral control unit in sequence to actuate different units in the glass forming machine during the production process.

As shown in FIG. 6, the issuance of such commands is triggered by pulses P. In dependence of the feedback data generated in the sense as described above with respect to FIG. 4, this feedback information may then be used for determination and control of the mixed sub-cycles.

The advantages of this method of control for a glass forming machine are at least two-fold. Firstly, time slots implemented in previously existing sequences of control mechanism may be avoided when feedback on termination of different sub-steps of the production process are generated and considered through the method of control. This allows for a reduction of production process time. Secondly, the provision of feedback information allows to interact during the control of the production process so as to achieve an event-driven control mechanism.

One example of the new method of control as outlined above could be the transfer of a gob from parison side in an IS glass forming machine to the finished form side using new electro-servo mechanisms where the pass-time behaviour may be clearly described, contrary to classical pneumatic mechanisms. A condition for transfer is the opening of the parison form, which otherwise would block the transfer mechanism. With previously existing control methods, the approach would be to open the parison form, and then to await lapse of a predetermined reaction time plus security time before start of the transfer action. To the contrary, using sub-cycle based control methodology according to the present invention allows to insert a sensor type of mechanism for detecting the actual opening time of the parison form for subsequent setting free of the transfer mechanism in the new sub-cycle of the overall operation cycle. This allows to save security time periods and to increase the overall control process.

Figure 7:
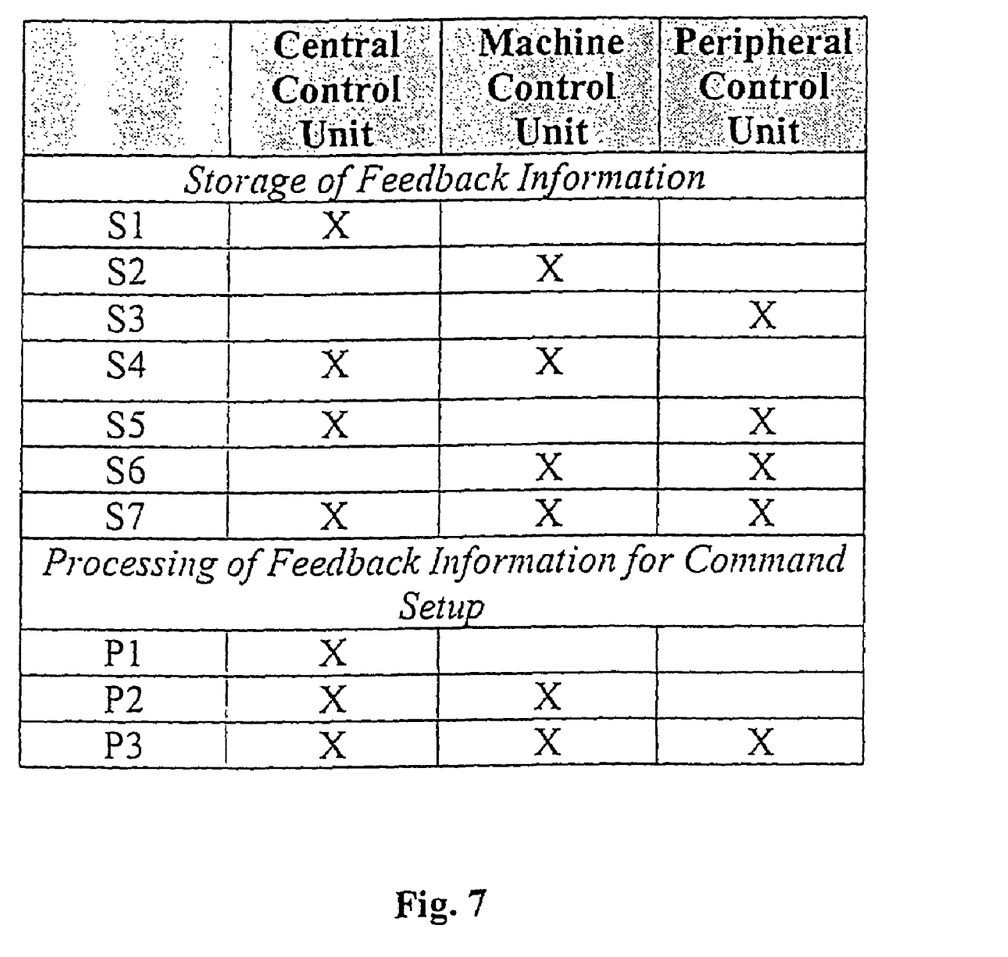
FIG. 7 shows a table illustrating different variations of the method shown in FIG. 6.

FIG. 7 shows a table illustrating variations of the method shown in FIG. 6.

As shown in FIG. 7, the storage of feedback information may be either achieved in the central control unit, the at least one machine control unit, or the peripheral control unit (see lines S1 to S3 in FIG. 7). Further options are a selection of two sub-units according to S4 to S6 shown in FIG. 7, or alternatively the storage of feedback information of all sub-units or, in other words, on all levels of hierarchy in the modular control system.

As shown in FIG. 7, similar options exist for the processing of feedback information for command setup. A first option would be to achieve this processing in the central control unit alone. Alternatively, the processing could be achieved in the central control unit and the machine control unit, further alternatively also in the peripheral control unit according to lines P1, P2, or P3 shown in FIG. 7.

While above preferred embodiments of the present invention has been described with reference to the drawings, it should be noted that clearly all related features explained with respect to different embodiments may as well be combined to arrive at further modifications and variations of the present invention. Therefore, the scope of the present invention is determined by the appended claims.

The invention claimed is:

1. A modular control system for controlling a glass forming machine having an operating cycle divided into a plurality of operating sub-cycles, comprising:
   at least one central control unit;
   at least one machine control unit being connected to the central control unit via a data bus; and
   a plurality of peripheral control units being connected to the machine control unit via related data buses; wherein:
   the central control unit is configured to issue plurality of commands for at least one peripheral control unit in sequence during each operating sub-cycle,
   the machine control unit is adapted to distribute control information received via the data bus to the plurality of peripheral control units in real time, and
   at least one peripheral control unit is configured to control at least one peripheral driver unit and to collect feedback information during at least one sub-cycle so as to determine control for a next operating sub-cycle in dependence of the feedback information.

2. The modular control system according to claim 1, wherein at least one peripheral control unit is integrated into a housing being attachable to a device being controlled by the peripheral control unit.

3. The modular control system according to claim 2, wherein the housing is attachable directly to a valve block which comprises a plurality of valves using a connector socket of the valve block.

4. A modular control system according to claim 1, wherein a plurality of peripheral driver units is arranged within a pre-defined sub-space of the machine.

5. The modular control system according to claim 1, wherein the measurement unit is adapted to measure an analogue value and/or to determine a measurement classification.

6. The modular control system according to claim 1, wherein the measurement unit is adapted to monitor the current flowing into a valve in a valve block.

7. The modular control system according to claim 1, wherein at least one peripheral control unit comprises an actuator, a sensor, or a combination thereof.

8. The modular control system according to claim 1, wherein the machine control unit comprises a maintenance stop unit adapted to process security related signals.

9. The modular control system according to claim 8, wherein the maintenance stop unit is adapted to receive security related signals via different input channels for redundant processing using parallel hardware.

10. The modular control system according to claim 8, wherein the maintenance stop unit is adapted to interrupt power supply to the peripheral driver units of the machine on occurrence of a system failure.

11. according to claim 1, wherein a multifunctional rack accommodates the at least one central control unit and at least one plug-in unit selected from a group comprising a valve driver unit, an analogue output unit, a binary input unit, and a central control unit.

12. The modular control system according to claim 1, wherein the central control unit is further adapted to exchange data with a programmable logic controller.

13. The modular control system according to claim 12, wherein exchange of data is achieved via virtual outputs to the programmable logic controller for forwarding internal state information of the modular control system to the programmable logic controller.

14. The modular control system according to claim 12, wherein exchange of data is achieved via virtual inputs for input of control commands from the programmable logic controller to the modular control system.

15. The modular control system according to claim 4, wherein it comprises at least one CANopen field bus adapted to connect sub-units of the modular control system.

16. The modular control system according to claim 1, wherein at least one machine control unit and/or at least one peripheral control unit are realized in dedicated hardware.

17. Method of controlling a glass forming machine having an operating cycle, comprising:
   dividing the operating cycle into a plurality of operating sub-cycles;
   issuing a plurality of commands from a central control unit to at least one peripheral unit in sequence during each operating sub-cycle;
   collecting feedback information during at least one operating sub-cycle; and
   determining control for a next operating sub-cycle in dependence of the feedback information.

18. A storage device for use in a mobile communication unit, where the storage device stores computer program instructions which when executed by a processor of the mobile communication unit cause the mobile communication unit perform a method of controlling a glass forming machine having an operating cycle, comprising: dividing the operating cycle into a plurality of operating sub-cycles; issuing a plurality of commands from a central control unit to at least one peripheral unit in sequence during each operating sub-cycle; collecting feedback information during at least one operating sub-cycle; and determining on control for the next sub-cycle in dependence of the feedback information.

* * * * *